United States Patent
Caspall (10) Patent No.: US 11,397,263 B2
(45) Date of Patent: Jul. 26, 2022

(54) SONAR SYSTEM WITH ACOUSTIC BEAM REFLECTOR

(71) Applicant: NAVICO HOLDING AS, Egersund (NO)

(72) Inventor: Jayme Caspall, Tulsa, OK (US)

(73) Assignee: NAVICO HOLDING AS, Egersund (NO)

( * ) Notice: Subject to any disclaimer, the term of this patent is extended or adjusted under 35 U.S.C. 154(b) by 0 days.

(21) Appl. No.: 17/087,910

(22) Filed: Nov. 3, 2020

(65) Prior Publication Data

US 2021/0270963 A1 Sep. 2, 2021

Related U.S. Application Data

(60) Provisional application No. 62/930,683, filed on Nov. 5, 2019.

(51) Int. Cl.
*G01S 15/89* (2006.01)
*G01S 15/42* (2006.01)

(52) U.S. Cl.
CPC .......... *G01S 15/8902* (2013.01); *G01S 15/42* (2013.01); *G01S 15/8922* (2013.01)

(58) Field of Classification Search
CPC ... G01S 15/8902; G01S 15/42; G01S 15/8922
See application file for complete search history.

(56) References Cited

U.S. PATENT DOCUMENTS

| 3,243,768 | A | * | 3/1966 | Roshon, Jr. | ........... | B06B 1/0607 367/151 |
| 4,031,502 | A | * | 6/1977 | Lefaudeux | ............ | B06B 1/0603 367/151 |
| 4,314,098 | A | * | 2/1982 | Maerfeld | ............... | H04R 1/406 181/175 |
| 4,719,605 | A | * | 1/1988 | Eder | ...................... | G01N 29/30 367/151 |
| 8,300,499 | B2 | | 10/2012 | Coleman et al. | | |

* cited by examiner

*Primary Examiner* — Daniel Pihulic
(74) *Attorney, Agent, or Firm* — Nelson Mullins Riley & Scarborough LLP (57) ABSTRACT

Sonar systems and related methods are provided. A sonar system for a water craft includes at least one transducer element having at least one emitting face. The at least one transducer element is mountable to the water craft. A sonar signal processor is in electronic communication with the at least one transducer element and is operative to associate signals with the at least one transducer element to cause at least one acoustic beam to be emitted from the at least one emitting face in a first beam direction. A beam reflector is mounted with respect to the at least one transducer element such that at least one beam reflecting surface of the beam reflector is positioned along the first beam direction. The at least one acoustic beam impinges upon the at least one beam reflecting surface and is reflected in a second beam direction different than the first beam direction.

19 Claims, 7 Drawing Sheets

SONAR SYSTEM WITH ACOUSTIC BEAM REFLECTOR

CROSS-REFERENCE TO RELATED APPLICATION(S)

This application claims priority to U.S. Provisional Application No. 62/930,683, filed Nov. 5, 2019, entitled "Sonar System with Acoustic Beam Reflector"; which is incorporated herein by reference in its entirety.

FIELD OF THE INVENTION

Embodiments of the present invention relate generally to the operation of sonar transducers, and more particularly, to systems and methods for operating sonar transducer assemblies utilizing acoustic beam reflectors.

BACKGROUND

Sonar has long been used to detect waterborne or underwater objects. For example, sonar devices may be used to determine depth and bottom topography, detect fish or other waterborne contacts, locate wreckage, etc. In this regard, due to the extreme limits to visibility underwater, sonar is typically the most accurate way for individuals to locate objects underwater. Sonar transducer elements, or simply transducers, produce sound or vibrations at a particular frequency that is transmitted into and through the water and also to detect echo returns from the transmitted sound that return to the transducer after reflecting off an object. The transducers can convert electrical energy into sound energy and also convert sound energy (e.g., via detected pressure changes) into an electrical signal, although some transducers may act only as a hydrophone for converting sound energy into an electrical signal without having a transmitting capability. The transducers are often made using piezoelectric materials.

A typical transducer produces a beam pattern that emanates as a sound pressure signal from a small source such that the sound energy generates a pressure wave that expands as it moves away from the source. For instance, a circular transducer (e.g., a cylindrical shaped crystal with a circular face) typically creates a conical shaped beam with the apex of the cone being located at the source. Linear (e.g., rectangular) transducer elements often generate a somewhat planar, fan-shaped beam pattern. Regardless, any reflected sound then returns to the transducer to form a return signal that may be interpreted as a surface of an object. Historically, these types of sonar systems primarily analyzed the column of water beneath a watercraft. However, "sidescan" sonar systems, wherein one or more sonar transducers are used to analyze water to either side of their vessel, also are known.

BRIEF SUMMARY

In presently available sonar systems, the radiating or emitting face of a transducer element is aimed in the same direction as the desired direction of propagation of the acoustic beam emitted therefrom. For instance, in a "downscan" transducer, the emitting face may be aimed downward relative to the surface of a body of water on which a vessel operates such that emitted acoustic beams are directed into the water column and toward bottom features substantially directly below the vessel. Also, in certain known sonar systems that employ a cylindrical, or disc, shaped transducer element, although the transmitting crystal has two faces that will radiate or emit acoustic energy, only one of the faces is used for sonar purposes. In particular, the transducer assembly may define an interior volume, sometimes referred to as an "acoustic window," which typically is designed to provide for high transmission of sound. The transducer element is disposed within the transducer assembly such that the emitting face thereof is aimed into the acoustic window, which is defined between the emitting face and the water into which the sound must propagate. The non-emitting surfaces are isolated from the water by placing low density, low stiffness materials, such as polyurethane foam, thereon. Thus, acoustic energy reflects back into the transmitting crystal upon hitting these surfaces. However, such transducer element configurations and transducer assemblies suffer from a number of drawbacks. For instance, they suffer from low efficiency and high susceptibility to cracking from high voltage excitation.

In contrast, in some example embodiments of the present invention, a transducer element may be disposed in a position such that its emitting face(s) are rotated (e.g., ninety (90) degrees) relative to the ultimate direction in which it is desired that the acoustic beams propagate. Further, a transducer assembly may comprise a beam reflector mounted in a fixed position with respect to the transducer element. As described in more detail herein, the beam reflector may comprise one or more beam reflecting surfaces on which emitted acoustic beam(s) impinge and, thereby, the beam reflector may redirect the acoustic beam(s) in a desired direction (e.g., downward below the water craft or sideways off to the sides of the water craft). In some embodiments, the transducer element may be a cylindrical transducer having two circular emitting faces. Unlike known systems described above, both faces of the transducer element may be in contact with the acoustic window in various embodiments, and thus acoustic energy may be radiated laterally outward from both sides of the transducer element toward the one or more beam reflecting surfaces.

In various embodiments, a number of advantages are realized over traditional transducer element and assembly configurations. For example, in some embodiments, the mechanical boundary conditions may be symmetric, such that the bending and shear modes are less likely to be excited. As a result, the total distortion stress energy may be reduced, as may the probability of failure of the transducer element under high voltage excitation. Further, in various embodiments, both circular faces of a transducer element may be used to radiate acoustic energy and, therefore, may contribute radiation loss. In some embodiments, the increase in total radiating surface area may increase the efficiency of the sound radiation into the far field (e.g., distances far from the source). In various embodiments, the increase in total loss due to radiation may broaden the bandwidth of the radiated sound. In addition, a symmetrical boundary condition in some embodiments may reduce the rigid body acceleration of the transmitting crystal. For instance, the radiation mass of the epoxy in some embodiments may be balanced on both sides (e.g., "left" and "right"), and thus the transmitting crystal may have no, or minimal, rigid body motion. As a result, the motion of the radiating faces may be larger in some embodiments, and this may also lead to higher efficiency radiation. Accordingly, various embodiments of the present invention may address the issues with prior art transducer assemblies described above, and they may obtain better performance from the same transmitting crystal(s) in the same size transducer assembly package.

Also, some embodiments may yield efficiencies and repeatability in assembly. For instance, where a cylindrical transducer element is used, solder may be used to make an electrical connection between a wire and the electrode on the radiating faces of the transducer element, but neither of these soldered surfaces are used as the "reference surface" for mounting the transducer element. Rather, the cylindrical surface may be used as the mounting reference for the transmitting crystal. Thus, in contrast to prior art configurations, there may not be a need to accommodate an uneven surface during assembly.

In an example embodiment, a sonar system for a water craft is provided. The sonar system comprises at least one transducer element. The at least one transducer element has at least one emitting face and is mountable to the water craft. The sonar system further includes a sonar signal processor in electronic communication with the at least one transducer element. The sonar signal processor is operative to associate signals with the at least one transducer element to cause at least one acoustic beam to be emitted from the at least one emitting face in a first beam direction. The sonar system further includes a beam reflector mounted in a fixed position relative to the at least one transducer element. The beam reflector comprises at least one beam reflecting surface positioned along the first beam direction such that, when the at least one acoustic beam is emitted, the at least one acoustic beam impinges upon the at least one beam reflecting surface and is reflected in a second beam direction different than the first beam direction.

In some embodiments, the at least one transducer element has a first emitting face and a second emitting face disposed on an opposite side of the transducer element from the first emitting face. The sonar signal processor is operative to associate signals with the at least one transducer element to cause a first acoustic beam to be emitted from the first emitting face in the first beam direction and a second acoustic beam to be emitted from the second emitting face in a third beam direction. In some embodiments, the beam reflector comprises a first beam reflecting surface positioned along the first beam direction and a second beam reflecting surface positioned along the third beam direction. In some embodiments, when the second acoustic beam is emitted, the at second acoustic beam impinges upon the second beam reflecting surface and is reflected in a fourth beam direction different than the third beam direction.

In some embodiments, the first beam direction is alongship.

In some embodiments, the second beam direction is vertically downward.

In some embodiments, the at least one beam reflecting surface is curved.

In some embodiments, the at least one transducer element is part of a transducer array.

In another example embodiment, a sonar system for a water craft is provided. The sonar system comprises at least one transducer element. The at least one transducer element has at least one emitting face. An axis extends perpendicularly to the at least one emitting face of the at least one transducer element, and the at least one transducer element is mountable to the water craft. The sonar system further includes a sonar signal processor in electronic communication with the at least one transducer element. The sonar signal processor is operative to associate signals with the at least one transducer element to form at least one acoustic beam. The sonar system further includes a beam reflector positioned along the axis. The beam reflector comprises at least one beam reflecting surface disposed in facing opposition to the at least one emitting face of the at least one transducer element. The at least one beam reflecting surface is disposed at an angle to the axis.

In some embodiments, the angle is about 45 degrees.

In some embodiments, the at least one transducer element comprises a piezoelectric ceramic disc. In some embodiments, the at least one acoustic beam is conical.

In some embodiments, the at least one beam reflecting surface is disposed such that a center impingement point on the beam reflecting surface is positioned a distance from the at least one emitting face of the at least one transducer element, wherein the distance is less than 6 in.

In some embodiments, the axis extends in an athwartship direction.

In some embodiments, the at least one beam reflecting surface is formed of a foam material.

In yet another example embodiment, a method of using an underwater sonar system is provided. The method comprises providing at least one transducer element. The at least one transducer element has at least one emitting face. The method further includes providing a beam reflector having at least one beam reflecting surface in a fixed position relative to the at least one transducer element such that an acoustic beam emitting from the at least one emitting face impinges upon the at least one beam reflecting surface. The method further includes associating signals with the at least one transducer element so as to form at least one acoustic beam. The at least one acoustic beam is emitted from the at least one emitting face and propagates in a first beam direction that impinges upon the at least one beam reflecting surface. Following impingement on the at least one beam reflecting surface, the at least one acoustic beam propagates in a second beam direction that is different than the first beam direction.

In some embodiments, the method further comprises receiving sonar returns at the at least one beam reflecting surface and reflecting the sonar returns in a direction opposite the first beam direction such that the reflected sonar returns are received at the at least one transducer element.

In some embodiments, the method further comprises encapsulating the at least one transducer element and the at least one beam reflecting surface in a potting compound.

In some embodiments, the at least one transducer element comprises first and second transducer elements. The at least one beam reflecting surface comprises first and second beam reflecting surfaces disposed in facing opposition to each other. Providing the beam reflector comprises disposing the beam reflector with respect to the first and second transducer elements such that the first beam reflecting surface is disposed opposite a first transducer element emitting face and such that the second beam reflecting surface is disposed opposite a second transducer element emitting face.

In some embodiments, the at least one emitting face comprises first and second emitting faces. The at least one beam reflecting surface comprises first and second beam reflecting surfaces disposed in facing opposition to each other. Providing the beam reflector comprises disposing the beam reflector with respect to the first and second emitting faces such that the first beam reflecting surface is disposed opposite the first emitting face and such that the second beam reflecting surface is disposed opposite the second emitting face.

Methods of manufacturing various example embodiments described herein are also contemplated.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Further, either of the terms "or" and "one of ______ and ______," as used in this disclosure and the appended claims is intended to mean an inclusive "or" rather than an exclusive "or." That is, unless specified otherwise, or clear from the context, either of the phrases "X employs A or B" and "X employs one of A and B" is intended to mean any of the natural inclusive permutations. That is, either phrase is satisfied by any of the following instances: X employs A; X employs B; or X employs both A and B, regardless whether the phrases "at least one of A or B" or "at least one of A and B" are otherwise utilized in the specification or claims. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," or the like, as used herein does not necessarily refer to the same embodiment, although it may.

Figure 1:
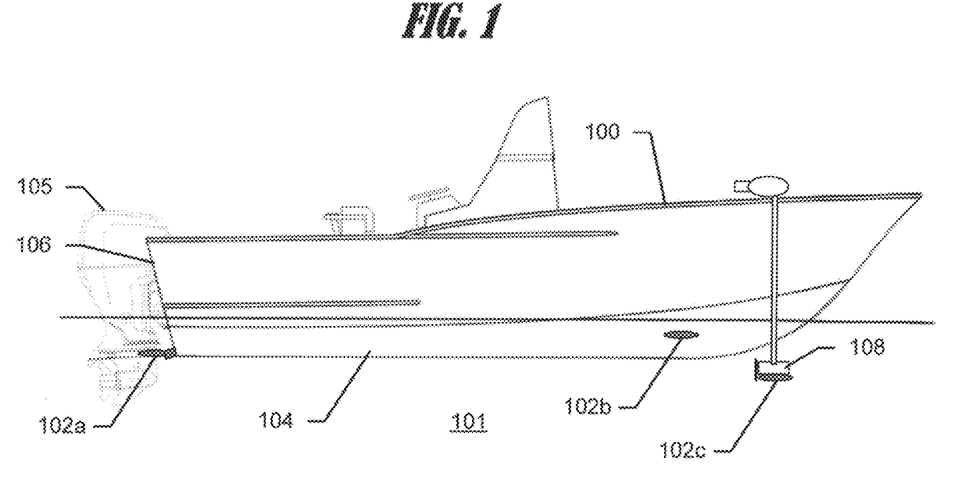
FIG. 1 is a schematic side view of an example water craft (e.g., vessel) including a sonar transducer assembly in accordance with some embodiments discussed herein.

As depicted in FIG. 1, a watercraft, e.g. vessel 100, configured to traverse a marine environment, e.g. body of water 101, may use one or more sonar transducer assemblies 102a, 102b, and 102c disposed on and/or proximate to the vessel. The vessel 100 may be a surface watercraft, a submersible watercraft, or any other implementation known to those skilled in the art. The transducer assemblies 102a, 102b, and 102c may each include one or more transducer elements configured to transmit sound waves into a body of water, receive sonar return signals from the body of water, and convert the sonar return signals into sonar return data.

One or more sonar, or acoustic, beams may be generated by the one or more transducer assemblies 102a, 102b, and 102c when deployed in the body of water 101. In some instances, a plurality of transducer elements may be embodied in a transducer assembly. In some instances, the transducer assembly may include one or more of a right scanning (e.g., sidescan) element, a left scanning (e.g., sidescan) element, a conical downscan sonar element, and/or a bar (e.g., linear, elongated rectangle, or the like) downscan sonar element, which may be housed within a transducer housing. In some example embodiments, the transducer assembly may be or include a transducer array, e.g. a "phased array" or a "frequency-steered array." The transducer array may include a plurality of transducer elements arranged on a printed circuit board (PCB). The PCB may mechanically support and electrically connect the electronic components, including the transducer elements using conductive tracks (e.g. traces), pads, and other features. The conductive tracks may comprise sets of traces, for example, and each transducer element may be mounted to the PCB such that the transducer element is in electrical communication with a set of traces. Each transducer element, sub-array, and/or the array of transducer elements may be configured to transmit one or more sonar pulses and/or receive one or more sonar return signals.

The transducer arrays or individual transducer elements may transmit one or more sonar signals, e.g. acoustic beams, into a body of water with a transmit transducer, a transmit/receive transducer, or similar device. When the sound waves of the acoustic beams strike anything of differing acoustic impedance (e.g., the sea floor or something suspended in the water above the bottom), the acoustic waves reflect off that object. These echoes (or sonar return signals) may strike the transmitting transducer element and/or a separate one or more sonar receiver elements, which convert the echoes back into an electrical signal which is processed by a processor (e.g., processing circuity 407 and/or a sonar signal processor 465 as discussed in reference to FIG. 2) and sent to a display (e.g., an LCD) mounted in the cabin or other convenient location in the watercraft. This process may be referred to as "sounding." Since the speed of sound in water may be determined by the properties of the water (approximately 4800 feet per second in fresh water), the time lapse between the transmitted signal and the received echoes can be measured and the distance to the objects determined. This process may repeat itself many times per second. The results of many soundings are used to build a picture on the display of the underwater environment, e.g. a sonar image.

In an example embodiment, the one or more transducer assemblies may include multiple transducer arrays and/or transducer elements cooperating to receive sonar return signals from the underwater environment. The transducer arrays and/or transducer elements may be arranged in a predetermined configuration, e.g. relative positions, including known distances between each transducer array or transducer element. The relative positions and known distances between the transducer array or transducer element may be used to resolve an angle associated with the sonar returns (and, for example, a corresponding object in the underwater environment). The respective angles determined by the relative positions and known distances of the transducer arrays or transducer elements may be compared and combined to generate a two-dimensional and/or a three-dimensional position of the sonar return signals (and, for example, a corresponding object in the underwater environment).

In an example embodiment, a vessel 100 may include a main propulsion motor 105, such as an outboard or inboard motor. Additionally, the vessel 100 may include trolling motor 108 configured to propel the vessel 100 or maintain a position. The one or more transducer assemblies (e.g., 102a, 102b, and/or 102c) may be mounted in various positions and to various portions of the vessel 100 and/or equipment associated with the vessel 100. For example, the transducer assemblies may be mounted to the transom 106 of the vessel 100, such as depicted by transducer assembly 102a, may be mounted to the bottom or side of the hull 104 of the vessel 100, such as depicted by transducer assembly 102b, or may be mounted to the trolling motor 108, such as depicted by transducer assembly 102c.

Figure 2:
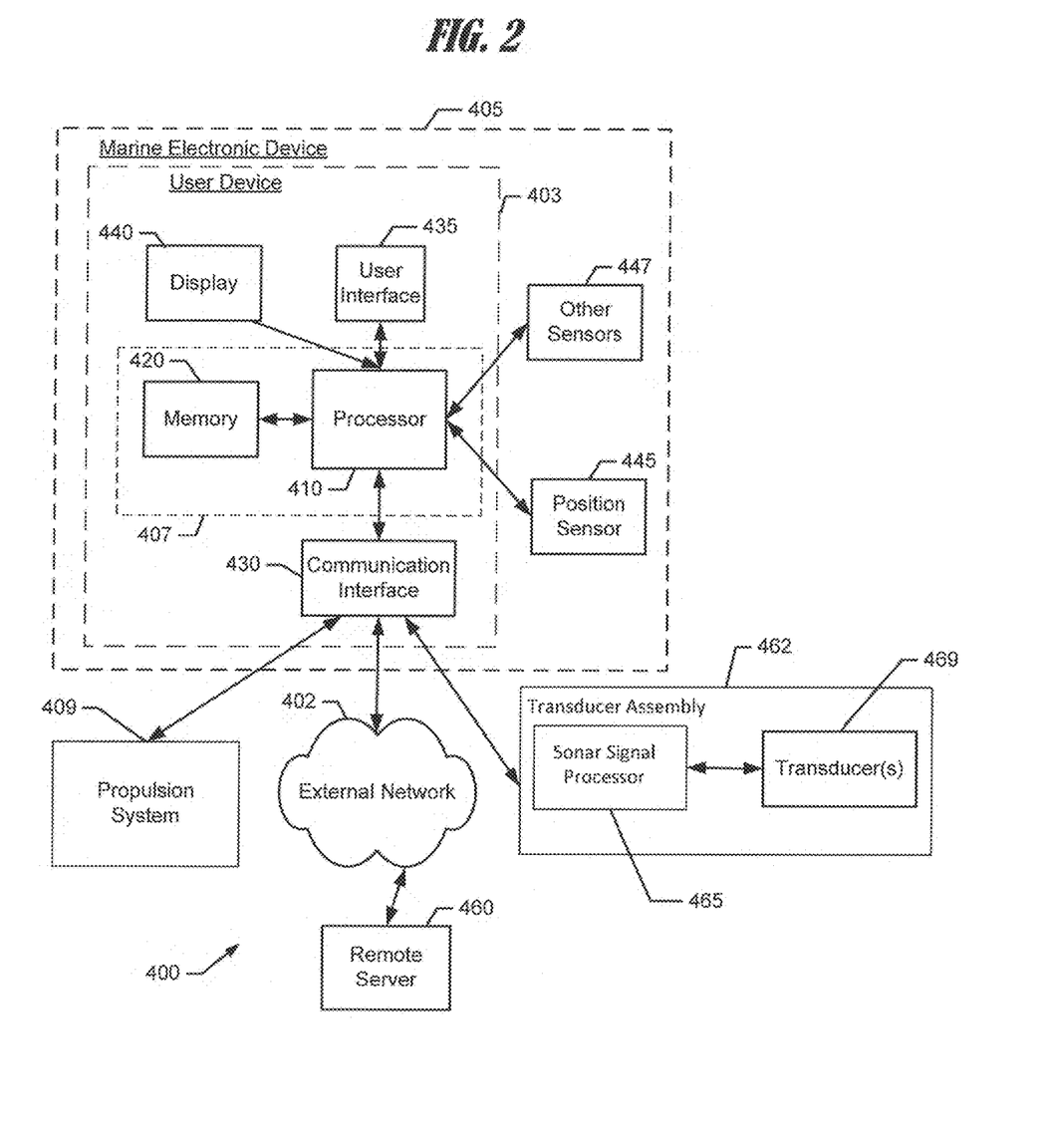
FIG. 2 is a block diagram of an example marine electronic system in accordance with some example embodiments discussed herein.

FIG. 2 shows a block diagram of a computing device, such as user device 403. The depicted computing device is an example marine electronic device 405. The marine electronic device 405 may include a number of different modules or components, each of which may comprise any device or means embodied in either hardware, software, or a combination of hardware and software configured to perform one or more corresponding functions. The marine electronic device may also be in communication with a network 402.

The marine electronic device 405 may also include one or more communications modules configured to communicate with one another in any of a number of different manners including, for example, via a network. In this regard, the communications module may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. Numerous other peripheral devices such as one or more wired or wireless multi-function displays may be included in a marine system 400.

The marine electronic device 405 may include a processor 410, a memory 420, a user interface 435, a display 440, one or more sensors (e.g. position sensor 445, other sensors 447, etc.), and a communication interface 430.

The processor 410 may be any means configured to execute various programmed operations or instructions stored in a memory device such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 410 as described herein. In this regard, the processor 410 may be configured to analyze electrical signals communicated thereto to provide or receive sonar data, sensor data, location data, and/or additional environmental data. For example, the processor 410 may be configured to receive sonar return data, generate sonar image data, and generate one or more sonar images based on the sonar image data.

In some embodiments, the processor 410 may be further configured to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other vehicles, e.g. watercraft, etc.

In an example embodiment, the memory 420 may include one or more non-transitory storage or memory devices such as, for example, volatile and/or non-volatile memory that may be either fixed or removable. The memory 420 may be configured to store instructions, computer program code, marine data, such as sonar data, chart data, location/position data, and other data associated with the navigation system in a non-transitory computer readable medium for use, such as by the processor for enabling the marine electronic device 405 to carry out various functions in accordance with example embodiments of the present invention. For example, the memory 420 could be configured to buffer input data for processing by the processor 410. Additionally or alternatively, the memory 420 could be configured to store instructions for execution by the processor 410.

The communication interface 430 may be configured to enable connection to external systems (e.g. an external network 402). In this manner, the marine electronic device 405 may retrieve stored data from a remote server 460 via the external network 402 in addition to or as an alternative to the onboard memory 420. Additionally or alternatively, the marine electronic device 405 may transmit or receive data, such as sonar signals, sonar returns, sonar image data or the like to or from a transducer assembly 462, more particularly to or from a sonar signal processor 465. In some embodiments, the marine electronic device 405 may also be configured to communicate with a propulsion system 409 of the vessel 100. The marine electronic device 405 may receive data indicative of operation of the propulsion system, such as engine or trolling motor running, running speed, or the like.

The position sensor 445 may be configured to determine the current position and/or location of the marine electronic device 405. For example, the position sensor 445 may comprise a GPS, bottom contour, inertial navigation system, such as machined electromagnetic sensor (MEMS), a ring laser gyroscope, or other location detection system.

The display 440, e.g. screen, may be configured to display images and may include or otherwise be in communication with a user interface 435 configured to receive input from a user. The display 440 may be, for example, a conventional LCD (liquid crystal display), a touch screen display, mobile device, or any other suitable display known in the art upon which images may be displayed.

In any of the embodiments, the display 440 may present one or more sets of marine data (or images generated from the one or more sets of data). Such marine data includes chart data, radar data, weather data, location data, position data, orientation data, sonar data, or any other type of information relevant to the watercraft. In some embodiments, the display 440 may be configured to present such marine data simultaneously as one or more layers or in split-screen mode. In some embodiments, a user may select any of the possible combinations of the marine data for display.

In some further embodiments, various sets of data, referred to above, may be superimposed or overlaid onto one another. For example, a route may be applied to (or overlaid onto) a chart (e.g. a map or navigational chart). Additionally or alternatively, depth information, weather information, radar information, sonar information, or any other navigation system inputs may be applied to one another.

The user interface 435 may include, for example, a keyboard, keypad, function keys, mouse, scrolling device, input/output ports, touch screen, or any other mechanism by which a user may interface with the system.

Although the display 440 of FIG. 2 is shown as being directly connected to the processor 410 and within the marine electronic device 405, the display 440 could alternatively be remote from the processor 410 and/or marine electronic device 405. Likewise, in some embodiments, the position sensor 445 and/or user interface 435 could be remote from the marine electronic device 405.

The marine electronic device 405 may include one or more other sensors 447 configured to measure environmental conditions. The other sensors 447 may include, for example, an air temperature sensor, a water temperature sensor, a current sensor, a light sensor, a wind sensor, a speed sensor, or the like.

The transducer assembly 462 may comprise one or more transducer(s) 469 that receive signals from and return signals to a sonar signal processor 465. In some embodiments, such as where transducer(s) 469 comprise a phased array or frequency-steered array, sonar signal processor 465 may comprise suitable beamforming hardware and/or software with which those of skill in the art are familiar and which may vary depending on the method of beamforming employed. In some embodiments, the sonar signal processor 465 may be configured to select individual transducer elements to gather sonar return data and/or cause transmission. Although depicted in the transducer assembly 462, it would be immediately understood by one of ordinary skill in the art that the sonar signal processor 465 may be a portion of the user device 403, the marine electronic device 405, the processing circuitry 407, the processor 410, or another remote device/system. Also, transducer(s) 469 may comprise transmit transducer elements, receive transducer elements, and/or transmit/receive transducer elements.

The propulsion system 409 may include the main propulsion motor 105 and/or trolling motor 108. The propulsion motor 105 and/or the trolling motor 108 may include one or more sensors to measure operation or speed of main propulsion motor 105 and/or the trolling motor 108.

Figure 3:
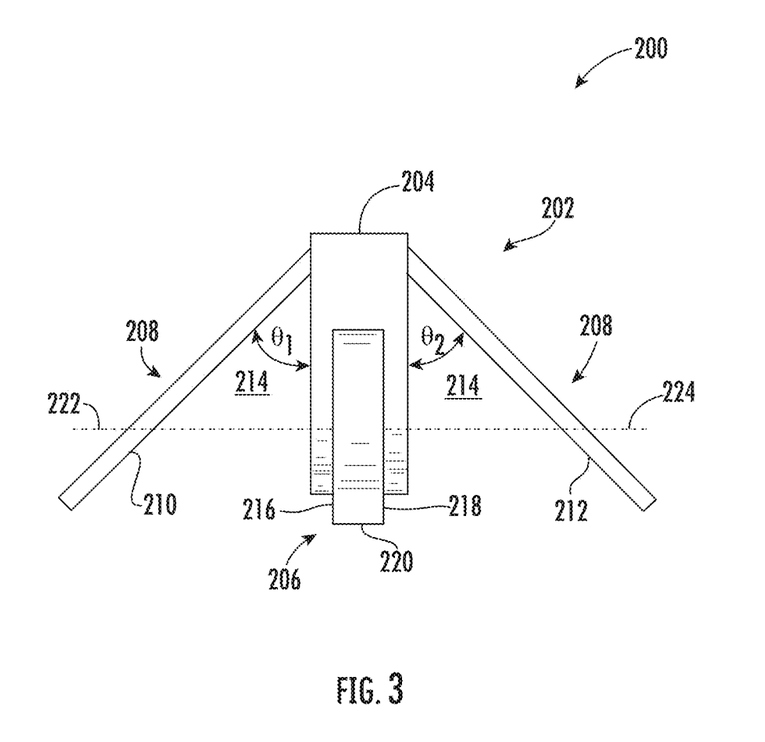
FIG. 3 is a schematic front view of a transducer assembly in accordance with some example embodiments discussed herein.
Figure 4:
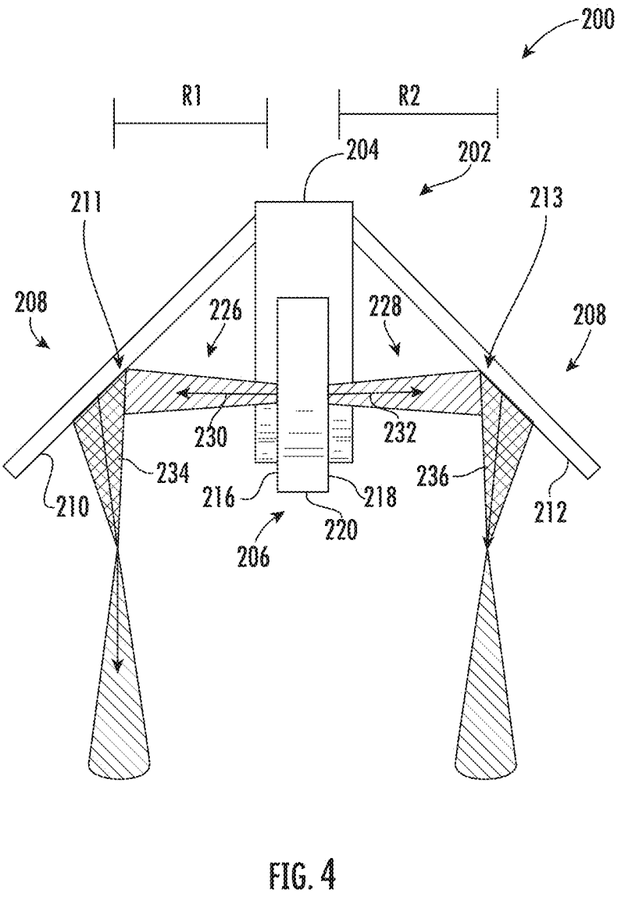
FIG. 4 is a schematic front view of the transducer assembly of FIG. 3 wherein the transducer element is producing acoustic beams in accordance with some example embodiments discussed herein.
Figure 5:
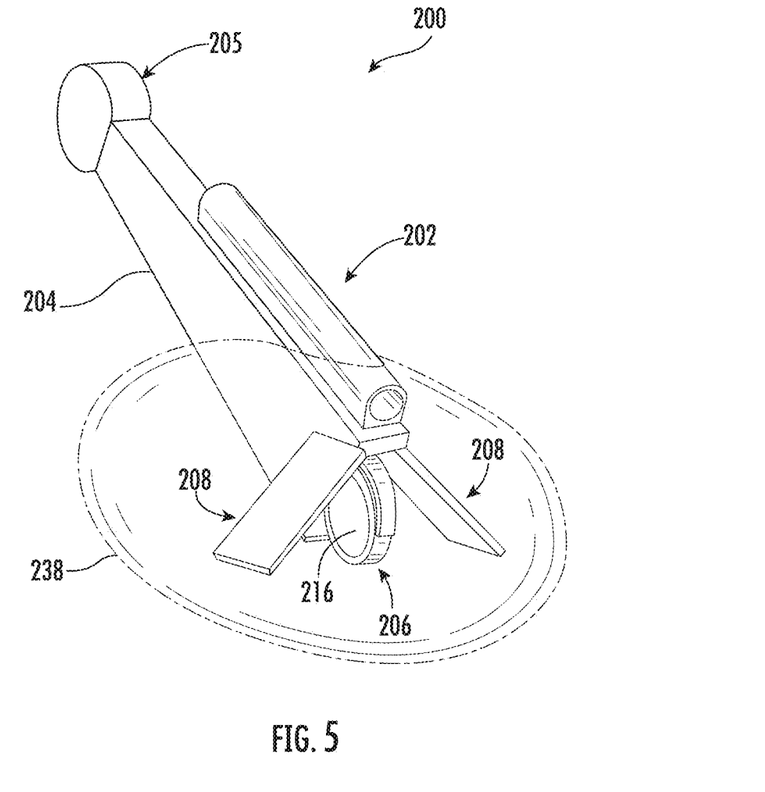
FIG. 5 is a perspective view of the transducer assembly of FIG. 3 wherein the transducer element and beam reflector are encapsulated in a potting compound in accordance with some example embodiments discussed herein.
Figure 7:
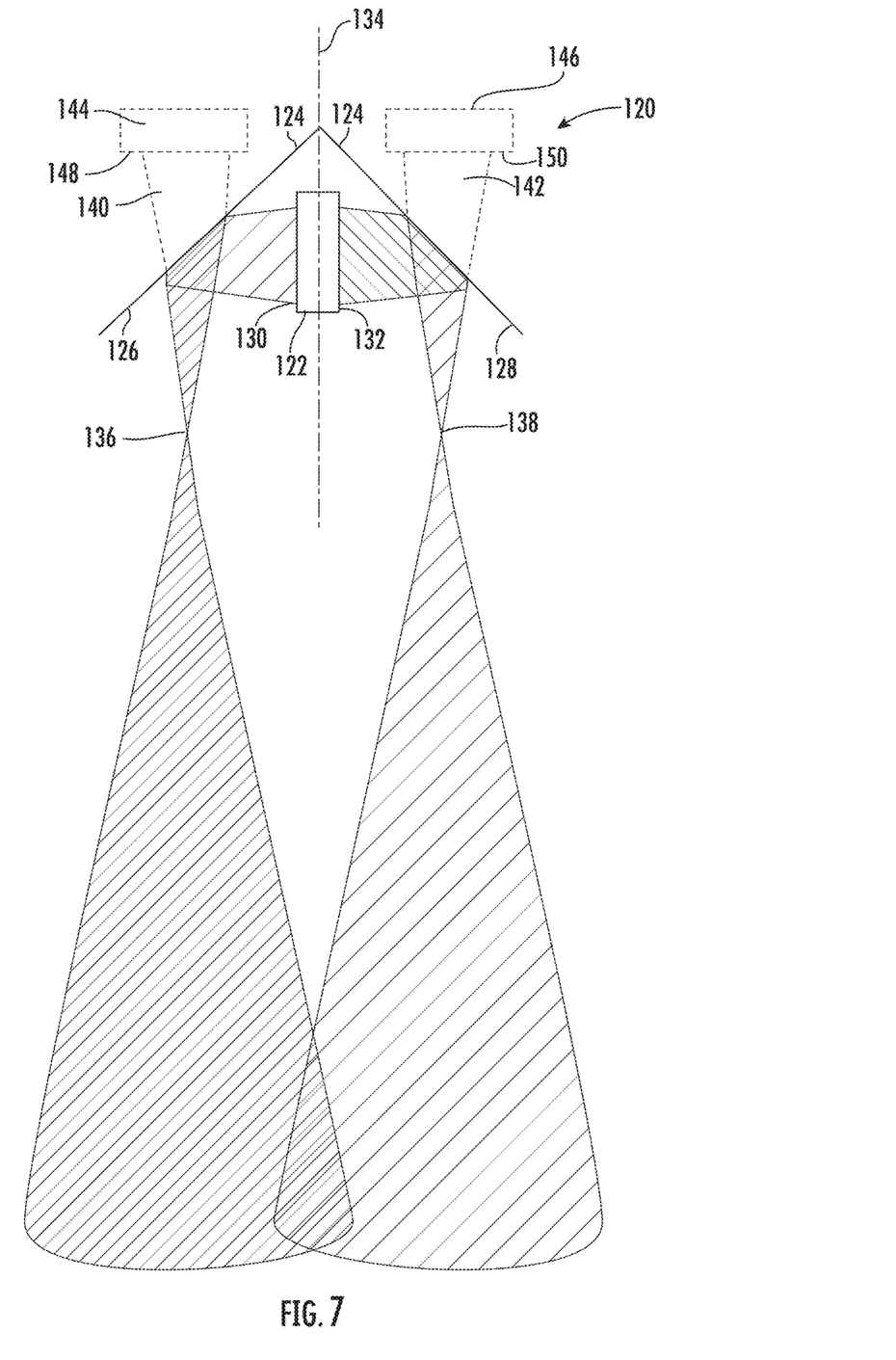
FIG. 7 is a schematic front view of a transducer assembly wherein the transducer element is producing acoustic beams in accordance with some example embodiments discussed herein.

Certain aspects of an example sonar system, including an example configuration and geometry of a transducer assembly and resulting acoustic beams, are discussed with reference to FIGS. 3-5 and 7. In this regard, FIG. 3 is a schematic front view of a transducer assembly in accordance with some example embodiments discussed herein. FIG. 4 is a schematic front view of the transducer assembly of FIG. 3, wherein a transducer element is producing acoustic beams in accordance with some example embodiments discussed herein. FIG. 5 is a perspective view of the transducer assembly of FIG. 3, wherein a transducer element and beam reflector are encapsulated in a potting compound in accordance with some example embodiments discussed herein. FIG. 7 is a schematic front view of a transducer assembly wherein a transducer element is producing acoustic beams in accordance with some example embodiments discussed herein.

When used herein, the terms "beam" and "acoustic beam" may refer to a sound wave propagating in a well-defined direction, but they may also refer to a portion of a sound wave pattern wherein the portion propagates along a given direction (e.g., the beam may be defined by sound emanated in the 3 dB to −3 dB range, although other ranges are contemplated). Those of skill in the art will appreciate that dispersion of a beam may occur for various reasons, and thus the depictions of acoustic beams in the present disclosure are simplified for the purpose of illustration. Additionally, some example embodiments are described below in the context of sound waves emanating from a transducer element, and thus in FIG. 4, acoustic beams are depicted as propagating away from a transducer element. However, those of skill in the art will appreciate that, in accordance with the principle of reciprocity for waves, embodiments of the present invention are equally applicable to the reverse process of receiving acoustic waves.

Referring now to FIGS. 3-5, a sonar system 200 in this embodiment may comprise a transducer assembly 202 having a housing 204. Sonar system 200 may also comprise a sonar signal processor, such as sonar signal processor 465 described above. Although such a sonar signal processor is not shown in FIGS. 3-5, it will be appreciated that suitable sonar signal processing circuitry may be disposed within or be remote from housing 204 in various embodiments. As those of skill in the art will appreciate, housing 204 may be mounted (e.g., via a mounting bracket 205) to a vessel in various locations.

Transducer assembly 204 comprises at least one transducer element 206. In this embodiment, only one such transducer element 206 is shown, but those of skill in the art will appreciate that more than one such transducer element 206 may be provided in other embodiments, and that some other embodiments may comprise one or more transducer arrays. The dimensions and relative position of transducer element 206 may be selected by those of skill in the art based on the particular implementation and method used to generate acoustic beams.

Additionally, transducer assembly 204 comprises at least one beam reflector 208. In various embodiments, beam reflector 208 may be utilized to redirect acoustic beam(s) emitted from transducer element 206 and, in some embodiments, to redirect return acoustic beam(s) toward transducer element 206. As described further below, beam reflector 208 comprises beam reflecting surfaces 210, 212 in this embodiment.

An acoustic window 214 may be defined between beam reflecting surfaces 210, 212 and transducer element 206 and/or its emitting faces. As those of skill in the art will appreciate, acoustic window 214 may be a volume within or outside of housing 204 that is conducive to high transmissivity of acoustic energy (e.g., with a low acoustic impedance). In some embodiments, acoustic window 214 may comprise air.

Beam reflector 208 in this embodiment may be coupled or integral with housing 204, and thus beam reflector 208 may be disposed in a fixed position relative to transducer element 206. However, this is not required in all embodiments. In some embodiments, beam reflector 208 or portions thereof, such as beam reflecting surfaces 210, 212, may be adjustable in position or movable, e.g., manually or via a motor. Also, in some embodiments, beam reflector 208 may not be directly coupled with housing 204. Furthermore, housing 204 is not required in all embodiments, and in some embodiments, one or all of the components described as being disposed within and/or coupled with housing 204 may be disposed exterior thereof. Indeed, in some embodiments, transducer element(s) 206 and/or beam reflector 208 may be disposed within a vessel hull, with or without housing 204.

In the depicted embodiment, beam reflecting surfaces 210, 212 may be generally flat, or planar, in shape. However, a beam reflecting surface in accordance with various embodiments may define a variety of shapes, and may be curved in some embodiments. For instance, in some embodiments, beam reflecting surfaces 210, 212 may be convex or concave with respect to the emitting faces of transducer element 206. In general, in some embodiments, beam reflecting surfaces 210, 212 may be surfaces that will not create undesirable diffusion of or destructive interference within the transmitted acoustic beam. In some embodiments herein, a beam reflecting surface may define a uniform cross-section along its length. Also, in some embodiments, a beam reflecting surface may have a uniform shape along the length of the beam reflector. However, in some embodiments, a beam reflector may comprise more than one beam reflecting surface, each of which may have different shapes. As those of skill in the art will appreciate, a variety of configurations and geometries of transducer elements and beam reflectors are contemplated and within the scope of various embodiments of the invention. For instance, other sonar systems in accordance with some example embodiments may comprise more than one beam reflector and one or multiple beam reflecting surfaces. In some embodiments, only one emitting face of a transducer may be used with a single beam reflecting surface.

In various embodiments, a beam reflector, or at least the portion thereof that comprises the beam reflecting surface(s), may be formed of any suitable material suitable to cause reflection of an acoustic beam. The material may be selected such that diffusion of an acoustic beam does not occur, or is minimized, as a result of the reflection. In various embodiments, beam reflector 208 and/or beam reflecting surfaces 210, 212 may be a smooth reflector made from a homogeneous material, such that it presents a regular smooth geometric impedance discontinuity relative to the material bearing the incident wave. In some embodiments, the law of reflection may apply continuously over the surfaces 210, 212, and the reflection coefficient at any location may be determined by the angle of incidence and the characteristic impedance of the material from which beam reflecting surfaces 210, 212 and/or beam reflector 208 is made, which may be uniform throughout the structure. In some embodiments, beam reflector 208 and/or beam reflecting surfaces 210, 212 may be formed of a relatively soft, or compliant material. In some embodiments, beam reflector 208 may be formed of a molded plastic material and beam reflecting surfaces 210 may be formed of a foam material, such as a urethane foam.

In some example embodiments, transducer element 206 may be a disc-shaped transducer element. In other words, transducer element 206 may be substantially cylindrical in shape in this embodiment. Transducer element 206 may be a piezoelectric crystalline structure operative to emit acoustic beam(s) into a body of water via the conversion of electrical energy into vibrational energy, which is thereby transferred into the water surrounding transducer assembly 202. Transducer element 206 may comprise first and second emitting faces 216, 218 in this embodiment, each of which may be substantially circular in shape. A cylindrical body portion 220 may extend between emitting faces 216, 218. In one example embodiment, transducer element 206 may be analogous to the transducer element(s) found in certain skimmer transducers from the HOOK2™ line of transducers commercially available from the assignee of the present application, except modified as discussed herein. Although a disc-shaped transducer element 206 is depicted in FIGS. 3-5, those of skill in the art should appreciate that embodiments of the present invention are not so limited, and in other example embodiments any suitable transducer element 206 may be used. In some embodiments, for example, one or more linear transducer elements may be provided, either alone or in addition to one or more disc-shaped transducer elements.

According to various embodiments, both circular emitting faces 216, 218 of transducer element 206 may be used to radiate acoustic energy. In that regard, in various embodiments, transducer element 206 may be mounted in or on housing 204 via body portion 220. Thus, in other words, neither emitting face 216, 218 may be used for mounting of transducer element 206, and emitting faces 216, 218 may both face or be exposed to acoustic window 214. As will be appreciated by those of skill in the art, and although not shown in FIGS. 3-5, electrical connections may be made on emitting faces 216, 218 via solder or the like. In some embodiments, the electrical connections may be symmetric about body portion 220, and for example, solder may be deposited in approximately the same place on each emitting face 216, 218. In some embodiments, the electrical connections may be made where the least acceleration or movement of each emitting face 216, 218 will occur, such as at the center thereof (depending on the excitation mode). In the depicted embodiment, transducer element 206 may be a radial-mode element.

As those of skill in the art will appreciate, in some implementations, it is possible for one electrode of a transducer element to be wrapped around the cylindrical surface to provide electrodes for each face that are accessible from only one of the faces. Doing so, however, may nullify some of the radiating surface of the piezoelectric crystal element. Specifically, the electric field generated in the crystal element no longer may be completely conformal with the polarization of the material, and as such, strain may not be induced in some of the material (on excitation), and some of the material may not contribute charge to the electrode surface when stressed (on receiving). Although embodiments are contemplated wherein such a transducer element configuration may be used, this implementation is not preferred in various embodiments. In general, for solid (not shells) piezoelectric transducer geometries, various embodiments will have electrodes on each face having opposite polarity so that the electric field generated by a pulse generator is directed through the thickness of the element.

As best seen in FIG. 3, an axis 222 may extend generally perpendicularly to emitting face 216, and an axis 224 may extend generally perpendicularly to emitting face 218. In some embodiments, axes 222, 224 may be parallel and/or collinear. In some embodiments, axes 222 and/or 224 may be parallel with and/or collinear with a centerline of transducer element 206. In various embodiments, beam reflecting surface 210 may be disposed along axis 222 in facing opposition to emitting face 216 of transducer element 206, and beam reflecting surface 212 may be disposed along axis 224 in facing opposition to emitting face 218 of transducer element 206. Also, in various embodiments, beam reflecting surfaces 210, 212 may be angled relative to axes 222, 224 and/or emitting faces 216, 218. For instance, as shown, beam reflecting surface 210 is disposed at an angle $\theta_1$ to axis 222, and beam reflecting surface 212 is disposed at an angle $\theta_2$ to axis 224. In various embodiments, each angle $\theta_1$, $\theta_2$ may be any angle between about zero degrees) (0°) and ninety degrees (90°), depending on the amount of redirection needed or desired. In some embodiments, each angle $\theta_1$, $\theta_2$ may be the same, and in other embodiments, each angle $\theta_1$, $\theta_2$ may be different. In the illustrated embodiment, each angle $\theta_1$, $\theta_2$ may be about forty-five degrees) (45°). As a result, and as described in more detail below, when acoustic beam(s) emitted from transducer element 206 impinge upon beam reflecting surfaces 210, 212, the acoustic beam(s) may be reflected in a different direction than the direction they had when emitted.

In general, in various example embodiments, and depending on the mounting location and orientation of transducer assembly 202 and/or transducer element 206 with respect to a vessel, axes 222, 224 may be substantially parallel with the surface of the water on which the vessel operates. Correspondingly, in various example embodiments, where transducer assembly 202 is mounted on the side of the vessel, axes 222, 224 may extend in an alongship, or stern to bow, direction. In other example embodiments, such as where transducer assembly 202 is mounted on the transom of the vessel, axes 222, 224 may extend in an athwartship, or port to starboard, direction. In either case, emitting faces 216, 218 may lie on or be tangent to a plane that is perpendicular with the surface of the water on which the vessel operates. In other words, emitting faces 216, 218 may lie on or be tangent to a plane that extends in an up-down, or hull-to-deck direction. Of course, those of skill in the art will appreciate that in other embodiments, either or both of axes 222, 224 may be disposed at an angle relative to the horizontal or vertical, and thus may not be parallel with the surface of the water on which the vessel operates in some embodiments. Similarly, in various embodiments the axes 222, 224 may be disposed at an angle relative to the alongship centerline of the vessel or to the athwartship centerline of the vessel, and thus may not be parallel with either such centerline of the vessel in some embodiments. Again, axes 206, 208 may vary in position depending on the mounting position and intended use of transducer assembly 202.

As noted above, transducer element 206 is operative (e.g., in conjunction with a suitable processor and/or beamforming circuitry or software, not shown in FIGS. 3-5) to generate one or more acoustic beam(s). Referring in particular to FIG. 4, transducer element 206 may generate acoustic beams 226, 228 that emanate from emitting faces 216, 218, respectively. Acoustic beam 226 may have a first beam direction 230, and acoustic beam 228 may have a first beam direction 232. In general, beam directions 230, 232 may be the directions in which acoustic beams 226, 228 propagate away from the emitting faces of transducer element 206. Beam directions 230, 232 may be defined relative to a plane defined by the faces 216, 218 of transducer element 206, or they may also be defined relative to axes 222, 224. In some embodiments, beam directions 230, 232 may be parallel and/or collinear with axes 222, 224, respectively. In other embodiments, such as where one or more transducer elements 206 are operative to generate one or more steerable acoustic beams, beam directions 230, 232 may, at least at times, be disposed at an angle to axes 222, 224. Those of skill in the art are familiar with various methods for determining beam direction, which may differ depending on the manner in which acoustic beams 226, 228 are generated. In some embodiments, acoustic beams 226, 228 may be conical in shape, at least initially, though that is not required.

In various embodiments, a beam reflector may be disposed relative to the transducer element(s) such that the beam reflecting surface(s) are positioned along the beam direction(s). In FIG. 4, for example, beam reflecting surface 210 is positioned along first beam direction 230, and beam reflecting surface 212 is positioned along first beam direction 232. In other words, first beam direction 230 is defined such that acoustic beam 226 propagates in a direction that causes acoustic beam 226 to impinge upon beam reflecting surface 210, and first beam direction 232 is defined such that acoustic beam 228 propagates in a direction that causes acoustic beam 228 to impinge upon beam reflecting surface 212. Depending on the type of transducer element 206 (or array) and the method of beamforming used, software and/or suitable beamforming circuitry may be used to steer the beams 226, 228 in such a direction, or in some cases, the desired first beam directions 230, 232 may result from the orientation and geometry of the emitting faces of transducer element 206 relative to beam reflector 208.

In some embodiments, the beam reflector may be positioned such that the beam reflecting surface(s) are close in proximity to the corresponding emitting face(s) of the at least one transducer element. Notably, the acoustic beam expands as it propagates outwardly from the emitting face. In this regard, the beam reflector can be positioned to redirect the beam at a point along the beam direction where the acoustic beam has minimal or limited expansion. In such a regard, the size of the beam reflecting surface can be relatively small, but still redirect the entire acoustic beam. This maintains low manufacturing costs and also enables maintaining a smaller footprint for the sonar system, which may be very beneficial in the embodiments where the beam reflector and the transducer element(s) are contained within the same housing. For example, the designed center point of impingement of the beam reflecting surface can be positioned at a pre-determined distance from the emitting face along the beam direction, where the distance is designed for close proximity (e.g., within 3 in., within 6 in., within 1 ft, within 2 ft., etc.). As will be appreciated, this distance may affect the beam pattern symmetry and the spacing between nulls and peaks. As an example, FIG. 4 illustrates that the designed center point 211 of the beam reflecting surface 210 is positioned a distance R1 along the beam direction 230 and the designed center point 213 of the beam reflecting surface 212 is positioned a distance R2 along the beam direction 232. In this regard, the acoustic beams 226, 228 are redirected before significantly expanding.

As shown in FIG. 4, acoustic beams 226, 228 may be reflected off of beam reflecting surfaces 210, 212. More particularly, in the case of reflection, those of skill in the art will appreciate that, in general, the wave front and phase of the wave front may change at the boundary. In various embodiments, however, the phase may not vary along beam reflector 208 and/or beam reflecting surfaces 210, 212. In some embodiments, beam reflecting surfaces 210, 212 may be ideal reflectors, or as close as possible thereto, in that the reflection coefficient may be nearly perfectly real and have a magnitude close to 1 (either positive or negative). In any event, following impingement on beam reflecting surface 210, acoustic beam 226 may have a second beam direction 234, and following impingement on beam reflecting surface 212, acoustic beam 228 may have a second beam direction 236. In the illustrated embodiment, first beam directions 230, 232 and second beam directions 234, 236 are different.

In this regard, due to the orientation of transducer element 206 and beam reflector 208, the first beam directions 230, 232 may be aimed in either an alongship or an athwartship direction, or at angles to either such direction, but may be substantially parallel with the surface of the water upon which the vessel operates. Upon reflection of acoustic beams 226, 228, the second beam directions 234, 236 may be in a substantially vertically downward direction, e.g., toward the seabed below the vessel. Of course, other configurations are contemplated and within the scope of the present invention. In some example embodiments, for instance, second beam directions 234, 236 may be substantially lateral of the vessel, such that acoustic beams 226, 228 are directed toward a side or sides of the vessel.

Beam reflectors in accordance with various embodiments preferably are positioned with respect to the transducer element(s) such that, following impingement upon and reflection off of the beam reflecting surface(s), the reflected portion of the acoustic beam(s) do not interfere with the transducer element(s). In other words, and for example, beam reflectors in accordance with various embodiments are preferably disposed at a distance from and orientation relative to the transducer element(s) that is sufficient to permit reflection of acoustic beam(s) that are transmitted from the transducer element(s) in a direction that does not cause the reflected acoustic beam(s) to impinge upon the transducer element(s) before they reach an interrogated object. In some embodiments, the beam reflector and/or beam reflecting surface(s) may be disposed vertically above or below the face of the transducer element from which an acoustic beam emanates, and in some embodiments, the beam reflector may be rotated or disposed at an angle relative to the orientation of the transducer element. Further, beam reflectors in accordance with various embodiments are preferably disposed at a distance from and orientation relative to the transducer element(s) that minimizes the size of the overall assembly or does not render it too large. In various embodiments, the region (e.g., between transducer element 206 and beam reflector 208) in which the incident and reflected waves interact may not be less coherent or less well-defined, as long as the amplitude is small enough to remain linear.

As can be seen in FIG. 4, the relative geometries of transducer element 206, beam reflector 208, and beam reflecting surfaces 210, 212 are selected such that neither second beam directions 234, 236 cause any portion of the transmitted acoustic beams 226, 228 to impinge upon transducer element 206 before arriving at the object to be interrogated. In various embodiments, sonar systems such as sonar system 200 may be configured to be perfectly reciprocal, such that acoustic beams returning from an interrogated object will impinge upon the beam reflecting surfaces 210, 212 and then be reflected toward the transducer element.

Additional aspects of the geometry of various components of a transducer assembly in accordance with various embodiments, and the acoustic beam(s) employed thereby, are discussed with reference to FIG. 7, which is a schematic representation of a transducer assembly 120. Analogous to transducer assembly 202 described above, transducer assembly 120 may comprise a transducer element 122 and a beam reflector 124. Beam reflector 124 comprises beam reflecting surfaces 126, 128, and transducer element 122 may have emitting faces 130, 132. Transducer assembly 120 may also comprise an assembly axis 134, which may be an axis about which beam reflecting surfaces 126, 128 and emitting faces 130, 132 are symmetric.

Similar to transducer element 220 described above, transducer element 122 is operative (e.g., in conjunction with a suitable processor and/or beamforming circuitry or software, not shown in FIG. 7) to generate two acoustic beams 136, 138 that emanate from emitting faces 130, 132, respectively. Beam reflecting surfaces 126, 128 are disposed relative to the transducer element 122 such that they are positioned along the direction in which beams 136, 138 are emitted, and as a result, acoustic beams 136, 138 impinge upon beam reflecting surfaces 126, 128, respectively. Accordingly, acoustic beams 136, 138 may be reflected off of beam reflecting surfaces 126, 128.

In this regard, if the configuration of the embodiment shown in FIG. 7 (including a single transducer 122 with dual emitting faces 130, 132 and a beam reflector 124) were not employed, then in order to generate acoustic beams 140, 142 analogous to acoustic beams 136, 138 and to replicate their direction of travel in one example, two transducers 144, 146, each using only one emitting face 148, 150, respectively, would need to be employed. The hypothetical transducers 144, 146 are shown in broken lines in FIG. 7 and are denoted as "Image Source 1" and "Image Source 2," respectively. Likewise, the hypothetical acoustic beams 140, 142 are also shown in broken lines in FIG. 7.

As shown in FIG. 7, in various embodiments, as acoustic beams 136, 138 propagate, there may be some overlap between beams 136, 138, and interference may occur. For this reason, the design and implementation of beam reflector 124, beam reflecting surfaces 126, 128, and/or the thickness of transducer element 122 may define where peaks and nulls occur. In various embodiments, it may be desirable to implement beam reflector 124, beam reflecting surfaces 126, 128, and transducer element 122 such that a null does not occur on axis 134. Again, beam reflector 124 and/or beam reflecting surfaces 126, 128 may not be planar in shape in all embodiments.

Also, in some embodiments, all or a portion of transducer assembly 202 or housing 204 may be encapsulated. Referring again to FIG. 5, for example, a portion of housing 204 comprising transducer element 206 and beam reflector 208 may be encapsulated in a potting compound 238. In general, a potting compound may be provided for excluding moisture and reducing shocks, and the potting compound may also limit rigid body motion of the transducer element. It will be appreciated that the potting compound may form the acoustic medium inside the transducer assembly, and differences in acoustic impedance between the potting compound and surrounding water may cause refraction at the interface between these materials that can shape a transmitted or received acoustic beam. Thus, the material used for the potting compound, and its acoustic characteristics as compared to those of the water in which the transducer assembly may be used, may be considered in selecting the design of the beam reflector 208 and/or beam reflecting surfaces 210, 212. As noted above, beam reflector 208 and/or beam reflecting surfaces 210, 212 need not be planar in shape in all embodiments.

Those of skill in the art are familiar with suitable materials for use as a potting compound. In various embodiments, for example, it is preferred that the potting compound may comprise a single acoustic medium that has an acoustic impedance closely matched to that of water. For instance, with respect to the compound's ability to limit rigid body motion of the transducer element, the compound may be a soft, "water-like" material. In various embodiments, solid elastomers are preferred. In various embodiments, some epoxies may also be used for this purpose. Additionally, the potting compound may also comprise a liquid in a thin shell in some embodiments.

Embodiments of the present invention provide methods, apparatus and computer program products for operating a sonar system. Various examples of the operations performed in accordance with embodiments of the present invention will now be provided with reference to FIG. 6.

Figure 6:
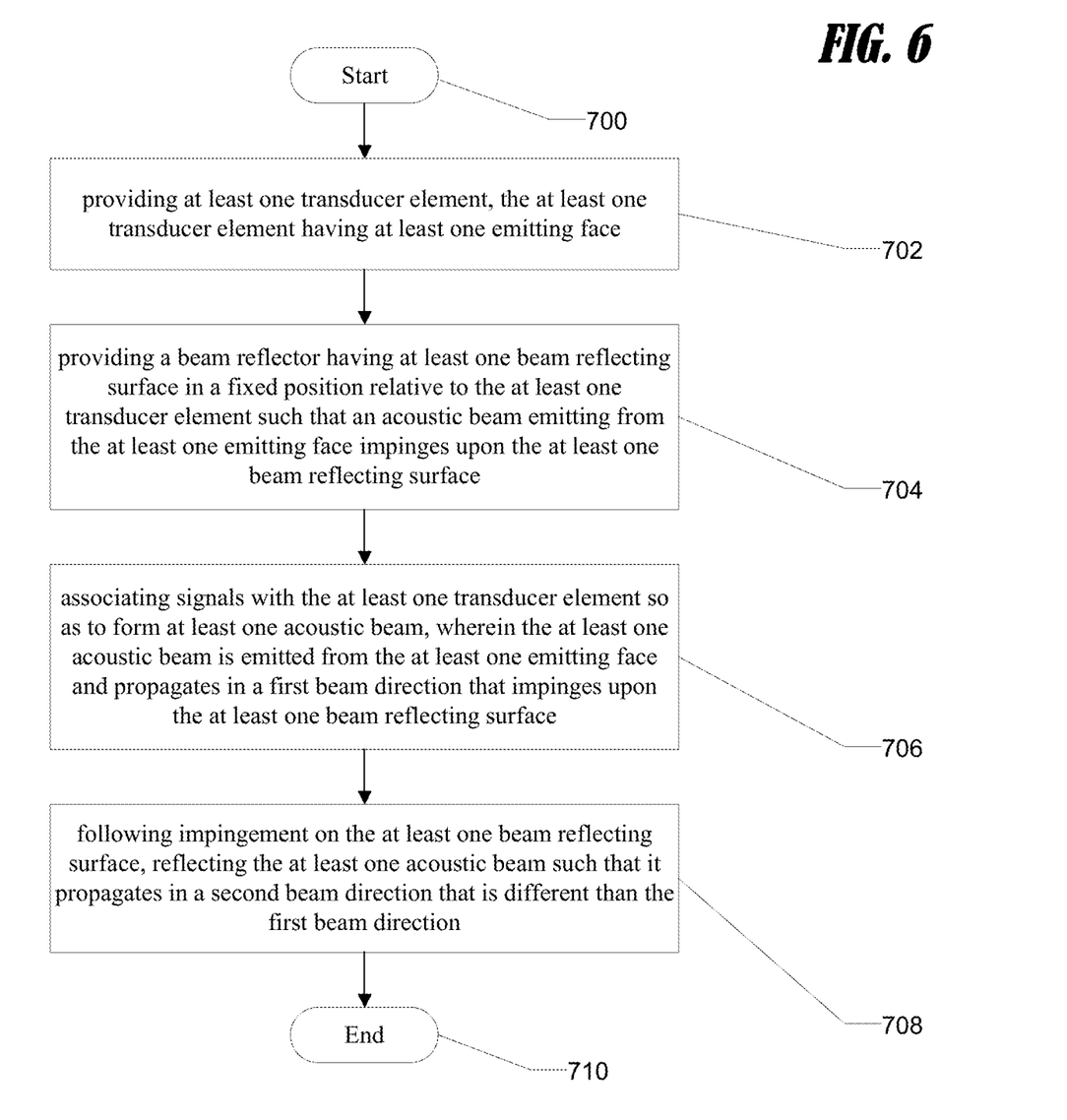
FIG. 6 is a flowchart of an example method in accordance with some example embodiments discussed herein.

FIG. 6 illustrates a flowchart according to example methods for operating a sonar system according to an example embodiment. The operations illustrated in and described with respect to FIG. 6 may, for example, be performed by, with the assistance of, and/or under the control of one or more of the processor 410, memory 420, communication interface 430, user interface 435, position sensor 445, other sensor 447, transducer assembly 462, sonar signal processor 465, display 440, and/or propulsion system 409.

At operation 700, the process starts. At operation 702, a transducer element is provided. In various embodiments, the transducer element may have at least one emitting face. At operation 704, a beam reflector is provided. In various embodiments, the beam reflector has at least one beam reflecting surface in a fixed position relative to the at least one transducer element such that an acoustic beam emitting from the at least one emitting face impinges upon the at least one beam reflecting surface Next, at operation 706, signals are associated with the transducer element(s) to form a first acoustic beam. In various embodiments, the at least one acoustic beam is emitted from the at least one emitting face, and the at least one acoustic beam propagates in a first beam direction that impinges upon the at least one beam reflecting surface. At operation 708, following impingement on the at least one beam reflecting surface, the first acoustic beam is reflected by the beam reflecting surface such that the first acoustic beam propagates in a second beam direction. In various example embodiments, the second beam direction is different than the beam first direction. At operation 710, the process ends.

FIG. 6 illustrates a flowchart of a system, method, and computer program product according to an example embodiment. It will be understood that each block of the flowchart, and combinations of blocks in the flowchart, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 420 and executed by, for example, the processor 410 and/or the sonar signal processor 465. As will be appreciated, any such computer program product may be loaded onto a computer or other programmable apparatus (for example, a marine electronic device 405 and/or transducer assembly 462) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 405 and/or transducer assembly 462) to cause a series of operations to be performed on the computer or other programmable apparatus to produce a computer-implemented process such that the instructions which execute on the computer or other programmable apparatus implement the functions specified in the flowchart block(s).

CONCLUSION

Based on the foregoing, it will be appreciated that embodiments of the invention provide systems and methods for utilizing a beam reflector in a sonar transducer assembly. As described herein, various embodiments may overcome issues encountered in prior art devices with having enough sound in the water. In some embodiments, the radiated acoustic energy may be more broadband, which may result in better imaging, such as obtaining better separation between closely-spaced objects. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A sonar system for mounting to a water craft and generating one or more sonar images of an underwater environment below, the sonar system comprising:
    at least one transducer element, the at least one transducer element having at least one emitting face, wherein the at least one transducer element is mountable to the water craft so as to extend underneath the water craft;
    a sonar signal processor in electronic communication with the at least one transducer element, the sonar signal processor operative to associate signals with the at least one transducer element to cause at least one acoustic beam to be emitted from the at least one emitting face in a first beam direction into the underwater environment; and
    a beam reflector mounted in a fixed position relative to the at least one transducer element, wherein the beam reflector comprises at least one beam reflecting surface positioned along the first beam direction such that, when the at least one acoustic beam is emitted, the at least one acoustic beam impinges upon the at least one beam reflecting surface and is reflected in a second beam direction different than the first beam direction,
    wherein the sonar signal processor is further configured to:
        receive sonar return data generated by receipt of sonar return signals by the at least one transducer element, wherein the sonar return signals returned from the underwater environment and reflected off the at least one beam reflecting surface prior to being received by the at least one transducer element; and
        generate, based on the sonar return data, sonar image data corresponding to generation of a sonar image of the underwater environment.

2. The sonar system of claim 1, wherein the at least one transducer element has a first emitting face and a second emitting face disposed on an opposite side of the transducer element from the first emitting face, and wherein the sonar signal processor is operative to associate signals with the at least one transducer element to cause a first acoustic beam to be emitted from the first emitting face in the first beam direction and a second acoustic beam to be emitted from the second emitting face in a third beam direction.

3. The sonar system of claim 2, wherein the beam reflector comprises a first beam reflecting surface positioned along the first beam direction and a second beam reflecting surface positioned along the third beam direction.

4. The sonar system of claim 3, wherein, when the second acoustic beam is emitted, the second acoustic beam impinges upon the second beam reflecting surface and is reflected in a fourth beam direction different than the third beam direction.

5. The sonar system of claim 1, wherein the first beam direction is alongship.

6. The sonar system of claim 1, wherein the second beam direction is vertically downward.

7. The sonar system of claim 1, wherein the at least one beam reflecting surface is curved.

8. The sonar system of claim 1, wherein the at least one transducer element is part of a transducer array.

9. A sonar system for mounting to a water craft and generating one or more sonar images of an underwater environment, comprising:
   at least one transducer element, the at least one transducer element having at least one emitting face, wherein an axis extends perpendicularly to the at least one emitting face of the at least one transducer element, and wherein the at least one transducer element is mountable to the water craft so as to extend underneath the water craft;
   a sonar signal processor in electronic communication with the at least one transducer element, the sonar signal processor operative to associate signals with the at least one transducer element to form at least one acoustic beam in the underwater environment; and
   a beam reflector positioned along the axis, wherein the beam reflector comprises at least one beam reflecting surface disposed in facing opposition to the at least one emitting face of the at least one transducer element;
   wherein the at least one beam reflecting surface is disposed at an angle to the axis,
   wherein the sonar signal processor is further configured to:
      receive sonar return data generated by receipt of sonar return signals by the at least one transducer element, wherein the sonar return signals returned from the underwater environment and reflected off the at least one beam reflecting surface prior to being received by the at least one transducer element; and
      generate, based on the sonar return data, sonar image data corresponding to generation of a sonar image of the underwater environment.

10. The sonar system of claim 9, wherein the angle is about 45 degrees.

11. The sonar system of claim 9, wherein the at least one transducer element comprises a piezoelectric ceramic disc.

12. The sonar system of claim 11, wherein the at least one acoustic beam is conical.

13. The sonar system of claim 9, wherein the at least one beam reflecting surface is disposed such that a center impingement point on the beam reflecting surface is positioned a distance from the at least one emitting face of the at least one transducer element, wherein the distance is less than 6 in.

14. The sonar system of claim 9, wherein the axis extends in an athwartship direction.

15. The sonar system of claim 9, wherein the at least one beam reflecting surface is formed of a foam material.

16. A method of using an underwater sonar system, wherein the underwater sonar system is mounted to a water craft and used to generate one or more sonar images of an underwater environment below the water craft, the method comprising:
   providing at least one transducer element, the at least one transducer element having at least one emitting face;
   providing a beam reflector having at least one beam reflecting surface in a fixed position relative to the at least one transducer element such that an acoustic beam emitting from the at least one emitting face impinges upon the at least one beam reflecting surface;
   associating, via a sonar signal processor, signals with the at least one transducer element so as to form at least one acoustic beam, wherein the at least one acoustic beam is emitted from the at least one emitting face and propagates in a first beam direction that impinges upon the at least one beam reflecting surface;
   wherein, following impingement on the at least one beam reflecting surface, the at least one acoustic beam propagates in a second beam direction that is different than the first beam direction,
   receiving, at the sonar signal processor, sonar return data generated by receipt of sonar return signals by the at least one transducer element, wherein the sonar return signals returned from the underwater environment and reflected off the at least one beam reflecting surface prior to being received by the at least one transducer element; and
   generating, based on the sonar return data, a sonar image of the underwater environment.

17. The method of claim 16, further comprising encapsulating the at least one transducer element and the at least one beam reflecting surface in a potting compound.

18. The method of claim 16, wherein the at least one transducer element comprises first and second transducer elements, wherein the at least one beam reflecting surface comprises first and second beam reflecting surfaces disposed in facing opposition to each other, wherein providing the beam reflector comprises disposing the beam reflector with respect to the first and second transducer elements such that the first beam reflecting surface is disposed opposite a first transducer element emitting face and such that the second beam reflecting surface is disposed opposite a second transducer element emitting face.

19. The method of claim 16, wherein the at least one emitting face comprises first and second emitting faces, wherein the at least one beam reflecting surface comprises first and second beam reflecting surfaces disposed in facing opposition to each other, wherein providing the beam reflector comprises disposing the beam reflector with respect to the first and second emitting faces such that the first beam reflecting surface is disposed opposite the first emitting face and such that the second beam reflecting surface is disposed opposite the second emitting face.

* * * * *